United States Patent
Sheehan et al.

(10) Patent No.: US 9,170,855 B2
(45) Date of Patent: *Oct. 27, 2015

(54) VIRTUAL APPLICATION EXTENSION POINTS

(71) Applicant: Microsoft Corporation, Redmond, WA (US)

(72) Inventors: John M Sheehan, Somerville, MA (US); Kristofer H Reierson, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/941,552

(22) Filed: Jul. 15, 2013

(65) Prior Publication Data

US 2013/0305264 A1 Nov. 14, 2013

Related U.S. Application Data

(63) Continuation of application No. 12/754,623, filed on Apr. 6, 2010, now Pat. No. 8,489,708.

(51) Int. Cl.
G06F 15/16 (2006.01)
G06F 9/54 (2006.01)
G06F 9/445 (2006.01)

(52) U.S. Cl.
CPC .............. *G06F 9/54* (2013.01); *G06F 9/44505* (2013.01)

(58) Field of Classification Search
CPC ....... G06F 9/465; G06F 9/54; G06F 9/44505; G06F 9/44521; G06F 9/44526
USPC .................................. 709/219, 227, 213, 217
See application file for complete search history.

(56) References Cited

U.S. PATENT DOCUMENTS 6,085,120 A 7/2000 Schwerdtfeger et al.
7,117,504 B2 10/2006 Smith et al.
(Continued)

FOREIGN PATENT DOCUMENTS

WO 2009050206 A2 4/2009
WO 2009052003 A2 4/2009

OTHER PUBLICATIONS

"Creating, Loading and Using Eclipse RCP Extension Points (Eclipse 3.4—Ganymede)", Retrieved at << http://rajakannappan.blogspot.com/2009/04/working-with-eclipse-rcp-extension.html >>, Apr. 14, 2009, pp. 4.

(Continued)

*Primary Examiner* — Thu Ha Nguyen
(74) *Attorney, Agent, or Firm* — Nicholas Chen; Kate Drakos; Micky Minhas

(57) ABSTRACT

A virtual application may be configured with several extension points within a host operating system. The virtual application may be configured with a private namespace in which various components, such as registry settings, dynamic linked libraries, and other components may reside. During configuration, links may be placed in the host operating system that may point to objects in the virtual application's private namespace so that the operating system and other applications may launch, control, or otherwise interact with the virtual application. The links may be located in a file system, registry, or other locations and may be available to other applications, including other virtual applications. A configuration routine may place the links into the host operating system at the time the application may be configured.

20 Claims, 3 Drawing Sheets

(56) References Cited

U.S. PATENT DOCUMENTS

| | | | |
|---|---|---|---|
| 7,383,327 B1* | 6/2008 | Tormasov et al. | 709/220 |
| 7,542,988 B1 | 6/2009 | Cook et al. | |
| 7,546,602 B2 | 6/2009 | Hejlsberg et al. | |
| 7,596,782 B2 | 9/2009 | Ebbo et al. | |
| 7,689,566 B1 | 3/2010 | Nieuwejaar et al. | |
| 7,962,918 B2 | 6/2011 | Schaefer et al. | |
| 8,004,998 B2 | 8/2011 | Levy et al. | |
| 8,091,084 B1* | 1/2012 | Dobrovolskiy et al. | 717/174 |
| 8,166,477 B1* | 4/2012 | Tormasov | 718/1 |
| 8,280,944 B2 | 10/2012 | Laadan et al. | |
| 2002/0095479 A1 | 7/2002 | Schmidt | |
| 2003/0126200 A1* | 7/2003 | Wolff | 709/203 |
| 2005/0204367 A1 | 9/2005 | Minium et al. | |
| 2006/0047974 A1 | 3/2006 | Alpern et al. | |
| 2006/0069692 A1 | 3/2006 | Pernia | |
| 2006/0070029 A1 | 3/2006 | Laborczfalvi et al. | |
| 2006/0277537 A1 | 12/2006 | Chan et al. | |
| 2007/0088797 A1 | 4/2007 | Boone et al. | |
| 2007/0106522 A1* | 5/2007 | Collins | 705/1 |
| 2007/0118615 A1 | 5/2007 | Boone et al. | |
| 2007/0156913 A1 | 7/2007 | Miyamoto et al. | |
| 2007/0220115 A1 | 9/2007 | Srinivasan et al. | |
| 2007/0233880 A1* | 10/2007 | Nieh et al. | 709/227 |
| 2008/0034364 A1 | 2/2008 | Lam et al. | |
| 2008/0098391 A1 | 4/2008 | Medvedev et al. | |
| 2008/0281798 A1 | 11/2008 | Chatterjee et al. | |
| 2009/0007151 A1 | 1/2009 | Sheehan et al. | |
| 2009/0007162 A1 | 1/2009 | Sheehan | |
| 2009/0254927 A1 | 10/2009 | Shlomai et al. | |
| 2009/0290501 A1 | 11/2009 | Levy et al. | |
| 2009/0313322 A1 | 12/2009 | Sheehan et al. | |
| 2011/0246617 A1* | 10/2011 | Sheehan et al. | 709/219 |
| 2011/0276621 A1 | 11/2011 | Edery et al. | |
| 2012/0151477 A1* | 6/2012 | Sinha et al. | 718/1 |
| 2012/0226773 A1* | 9/2012 | Tsuda | 709/217 |
| 2014/0025770 A1* | 1/2014 | Warfield et al. | 709/213 |
| 2014/0156813 A1* | 6/2014 | Zheng et al. | 709/220 |
| 2014/0280961 A1* | 9/2014 | Martinez et al. | 709/226 |
| 2014/0324793 A1* | 10/2014 | Glazemakers | 707/692 |

OTHER PUBLICATIONS

"Plugins, Extensions, and Extension Points", Retrieved at << http://jlense.sourceforge.net/project/platform.html >>, 2002-2003, pp. 3.

"International Search Report", Mailed Date: Nov. 28, 2011, Application No. PCT/US2011/030053, Filed Date: Mar. 25, 2011, pp. 9.

Non-Final Office Action, U.S. Appl. No. 12/754,623, mailing date Dec. 3, 2012, pp. 7.

Notice of Allowance, U.S. Appl. No. 12/754,623 mailing date Mar. 12, 2013, pp. 9.

"Office Action Received in Australia Patent Application No. 2011238676", Mailed Date: Feb. 5, 2014, 3 Pages.

"Search Report Received in European Patent Application No. 11766410.2", Mailed Date: Jul. 11, 2014, 9 Pages.

"Vmware: VMware ThinApp Deployment Guide", Published on: Mar. 9, 2009, Available at: http://www.vmware.com/files/pdf/VMware_ThinApp_Deployment_Guide.pdf.

"First Office Action and Search Report Received for Chinese Patent Application No. 201180017130.0", Mailed Date: Jan. 7, 2015, 15 Pages.

"Office Action Issued in Japanese Patent Application No. 2013-503780", Mailed Date: Apr. 23, 2015, 8 pages.

"Plan for Dramatically 'Improving' Client Environment Part 2: Trial Report for Fourth Virtualization Environment, Microsoft SoftGrid", in Windows Server World, vol. 12, No. 9, (the 199th Issue), Sep. 1, 2007, 11 pages.

* cited by examiner

VIRTUAL APPLICATION EXTENSION POINTS

CROSS REFERENCE TO RELATED APPLICATIONS

This application claims the benefit of and priority to U.S. patent application Ser. No. 12/754,623 entitled "Virtual Application Extension Points", filed Apr. 6, 2010 by John M. Sheehan et al., the entire contents of which are expressly incorporated by reference.

BACKGROUND

Application virtualization is a technique that isolates an application from a host operating system or from other applications that may operate in the operating system. The application virtualization may have many benefits, such as allowing two or more otherwise incompatible applications to execute side by side on the same operating system. In many cases, configuring and managing a virtual application may be much simpler than installing a host application.

SUMMARY

A virtual application may be configured with several extension points within a host operating system. The virtual application may be configured with a private namespace in which various components, such as registry settings, dynamic linked libraries, and other components may reside. During configuration, links may be placed in the host operating system that may point to objects in the virtual application's private namespace so that the operating system and other applications may launch, control, or otherwise interact with the virtual application. The links may be located in a file system, registry, or other locations and may be available to other applications, including other virtual applications. A configuration routine may place the links into the host operating system at the time the application may be configured.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
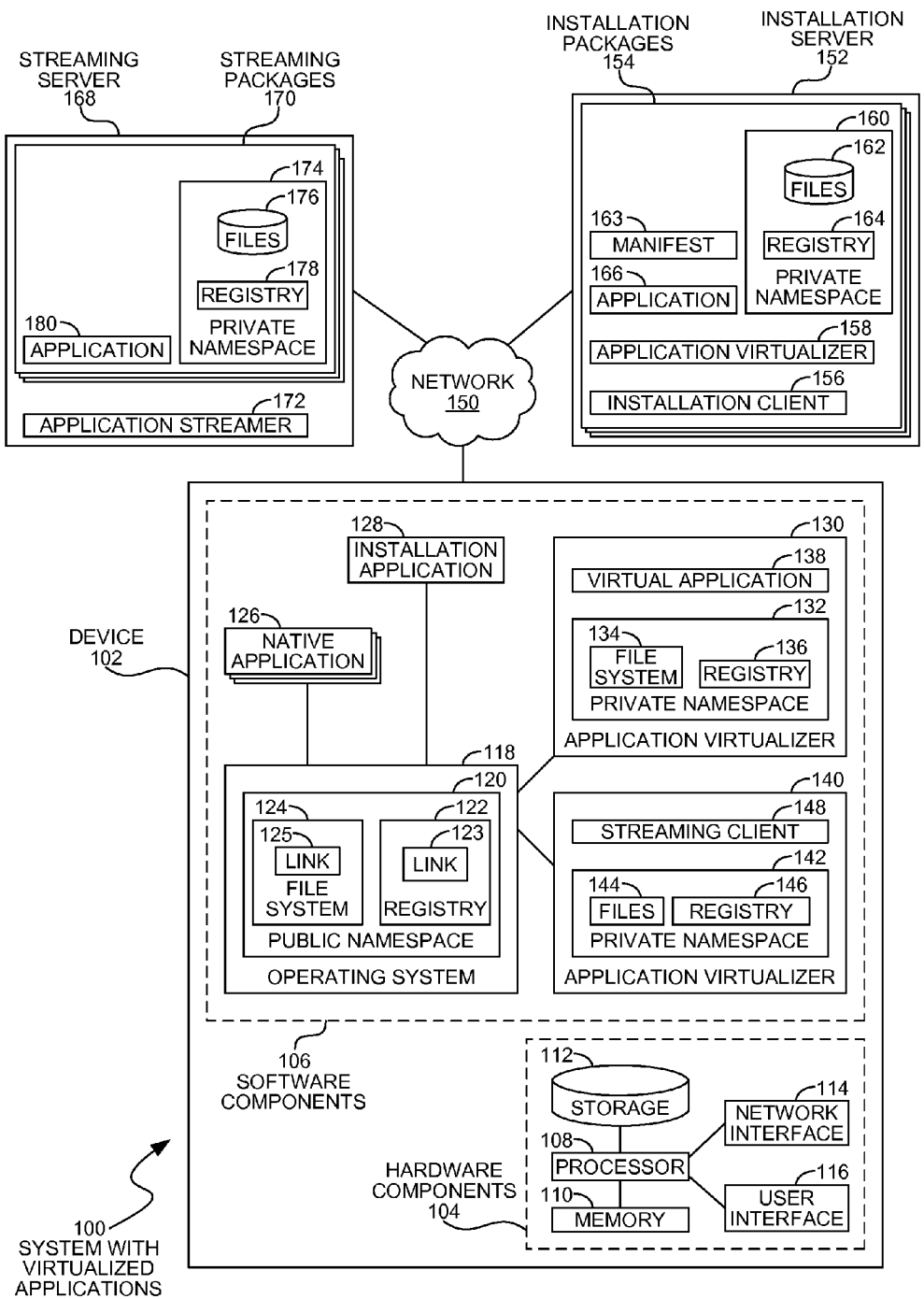
FIG. 1 is a diagram illustration of an embodiment showing a system with virtualized applications.

A virtual application may be executed in a host operating system with pointers from the host operating system's public namespace into a private namespace used by the virtual application. The pointers may reside in the host operating system's registry and file system, for example, and may allow other applications and the operating system to access, control, and operate the virtual application.

The virtual application may be configured and made available by a installation program that may create links within the host operating system to a private namespace within an application virtualizer. The installation program may install the application virtualizer so that a user or another application may launch and interact with the virtual application.

In many embodiments, a user may experience the virtual application operating within application virtualizer as if the virtual application were executing natively in the host operating system. The virtual application may present a graphical user interface and may allow interaction in the same manner as a natively executing application, such as cut and paste functions and other similar graphical user interface elements.

The virtual application may operate within an application virtualizer and may have the private namespace and the host operating system namespace made available to the virtual application. Such a configuration may allow the virtual application to access the host operating system file system, registry, and other functions, while keeping many data sources for the virtual application within the private namespace.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system with virtualized applications. Embodiment 100 is a simplified example of a system that may have virtualized applications in either a fully installed or streaming configuration.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a system that may execute certain applications in a virtualized manner. The virtualized manner may isolate the application from other applications and from an operating system. An application virtualizer may provide the separation layer by creating a private namespace that may be referenced by the virtualized application. The application virtualizer may allow the application to reference the private namespace first, and then if a reference is not found in the private namespace, the application may be able to reference items in a public namespace.

The private namespace may include items such as files, libraries, assemblies, registry settings, and other variables that may be used by the virtualized application for many different functions. In some cases, an item in a private namespace may launch the virtual application, and sometimes such a launch item may be received with variables or other information that may be consumed by the virtual application as it executes. In other cases, an item in a private namespace may include a value that may be queried.

The application virtualization system of embodiment 100 may include links or references in a public namespace that may point to items in a private namespace. The links may be a mechanism for different applications and direct user input to access the virtual applications. In some cases, such links may be used by one virtual application to communicate with or call another virtual application.

One use for a link may be for file type associations. Some operating systems may allow certain file types to be associated with specific applications. When a file is 'opened' using a file browser or other mechanism, a file type association entry in a registry or other location may be queried to determine which application, if any, may be associated with the file type. In the case of a virtualized application, a link in a private namespace may be created for associating the virtual application with the file type. In many operating systems, such a link may be placed in the operating system registry.

The links may be created during an installation process for the virtual application. The installation process may install an application virtualizer and other components that may be used to execute an application, as well as configure various links in a public namespace that reference items in the private namespace for the virtual application. The public links may be accessible to other applications, and may be intercepted and processed by an application virtualizer when the links are referenced.

The application virtualizer may receive a link to a location inside a private namespace and perform some action based on the link. In some cases, the application virtualizer may launch the application. Some cases may launch the application and pass parameters to the application that may have been received along with the link. In still other cases, the application virtualizer may return a value in the private namespace based on the request for the link.

The virtualized application may be a streamed application. In a streamed application, portions of the application may be downloaded from a streaming server on request as the application is being executed. A streaming client on a client device may request portions of the application from a streaming server as those portions are referenced by the application.

Embodiment 100 illustrates a device 102 that may represent a conventional computing device that contains hardware components 104 and software components 106. The device 102 may be any type of computing device, such as a desktop computer, server computer, game console, network appliance, or other device. In some cases, the device 102 may be a portable device, such as a laptop computer, netbook computer, personal digital assistant, mobile telephone, or other device.

The hardware components 104 may include a processor 108, random access memory 110, and nonvolatile storage 112. The hardware components 104 may also include a network interface 114 and a user interface 116.

The software components 106 may include an operating system 118 that may contain a public namespace 120. The public namespace 120 may include a registry 122 and a file system 124.

The public namespace 120 may include various items tracked by an operating system and made available to applications that execute within the operating system. In many embodiments, access to the public namespace 120 may be restricted in some cases. For example, an operating system may have access restrictions that may permit or deny access to certain portions of the public namespace 120 based on credentials presented by a user, device, application, or other entity that may attempt to access the items.

The public namespace 120 is called "public" because the public namespace 120 is managed by the operating system 120 and may be made available to different applications and users, subject to access restrictions. A virtual application may have private namespace that is "private" because the private namespace is available to the application but generally may not be searched or accessed by other applications.

Native applications 126 may be those applications that execute within the public namespace 120 of the operating system 118. Native applications may be conventional, non-virtualized applications.

An installation application 128 may be used to install and configure a virtual application on the device 102. The installation application 128 may perform several different functions so that a virtual application may successfully execute on the device 102, including creating a private namespace and providing links 123 and 125 from places in the public namespace 120 into the private namespace. The links 123 and 125 are illustrated as being inside the public namespace registry 122 and file system 124, respectively, and may be an entry point into the virtual application. An example of a process that may be performed by the installation application 128 may be found in embodiment 200 presented later in this specification.

An application virtualizer 130 may be installed by the installation application 128 may be a mechanism for executing an application in a virtual manner. The application virtualizer 130 may manage a private namespace 132 that may include a private file system 134 as well as private entries for a registry 136. The virtual application 138 may be executed by the application virtualizer 130 and may access the private namespace 132.

A streaming virtualized application may also be installed by the installation application 128. A streaming version may include an application virtualizer 140 that includes a private namespace 142 that contains a private file system 144 and private entries for a registry 146. Rather than a virtual application, a streaming client 148 may fetch portions of an application from a streaming server 168 as those portions are requested by the application or the application virtualizer 140. In some embodiments, the streaming client 148 may fetch portions of the private namespace 142, including files in the private file system 144 and private entries for the registry 146.

The private namespaces 132 and 142 may be accessible by the virtual application 138 or a virtual application supplied by the streaming client 148 as the virtual application executes. The private namespaces 132 and 142 may also be accessible through the links 123 and 125 that may point into the private namespaces 132 and 142, which may enable other applications to directly access the virtual application, its settings, and other information.

The device 102 is illustrated as being connected to a network 150 to which an installation server 152 and a streaming server 168 may be connected.

The installation server 152 may contain several installation packages 154 that may be used by the device 102 to install different virtual applications. The installation packages 154 may contain an installation client 156, which may be the executable installation application 128 that operates on the client device 102 to configure a virtual application for execution.

The installation packages 154 may include all of the components that may be used to execute an application in a virtual manner. For example, the installation package 154 may include an application virtualizer 158. The application virtualizer 158 may be installed so that it may execute natively on a client device and provide resources for a virtual application.

The installation package 154 may include a private namespace 160 that may include files 162 and entries for a registry 164. The private namespace 160 may be fully populated in that the private namespace 160 may include all of the files that represent the virtual application 166. In some cases, the private namespace 160 in the installation package 154 may include a framework or sparsely populated set of files, registry settings, and other items, and the framework may be further populated by the application 166 or the application virtualizer 158.

The installation package 154 may include a manifest 163. The manifest 163 may include links that are placed within a public namespace and may point to the private namespace 160. The manifest 163 may include additional items that may be processed by an installation client 156 during installation.

The installation server 152 illustrates one example of how a virtual application may be prepared prior to installation and execution on a client device 102. The installation server 152 may contain many different packages 154 that may be downloaded and installed on various client devices. In some embodiments, an installation package 154 may be stored on a Digital Versatile Disk (DVD) or other storage medium and read by a client device 102 to install the application.

The installation packages 154 may be created for full installations as well as streaming application. In a full installation, the installation package 154 may contain all of the files, including executable and data files, as well as any other resource to enable the virtual application to execute. A full installation may allow a client device 102 to fully execute the application without any additional resources, such as a streaming server 168 for example.

A streaming application may retrieve a majority of the executable and data files for a virtual application from a streaming server 168. A streaming application may be installed merely by installing a application virtualizer 158 and a streaming client. The streaming client may communicate with the streaming server 168 to retrieve portions of the application as requested. In some cases, a streaming application may be stored in a local cache, which may be re-used when the application is executed again.

In a streaming embodiment, each time the application is launched, a communication may occur between the client device 102 and the streaming server 168 to identify and retrieve the latest version of the application. The streaming server 168 may transmit a small portion of the application to the client device 102 so that the application may begin execution, and then transmit additional portions as those portions are requested by the application. A streaming client may monitor which portions are being requested and retrieve those portions from the streaming server 168.

The streaming server 168 may include several streaming packages 170, each of which may represent a different application. An application streamer 172 may communicate with a streaming client to download the portions of the streaming packages 170 that may be requested by a streaming client.

Each streaming package 170 may include a private namespace 174 that may include files 176 and settings for a registry 178. The files 176 may include all or a portion of the executable files for the virtualized application 180.

Figure 2:
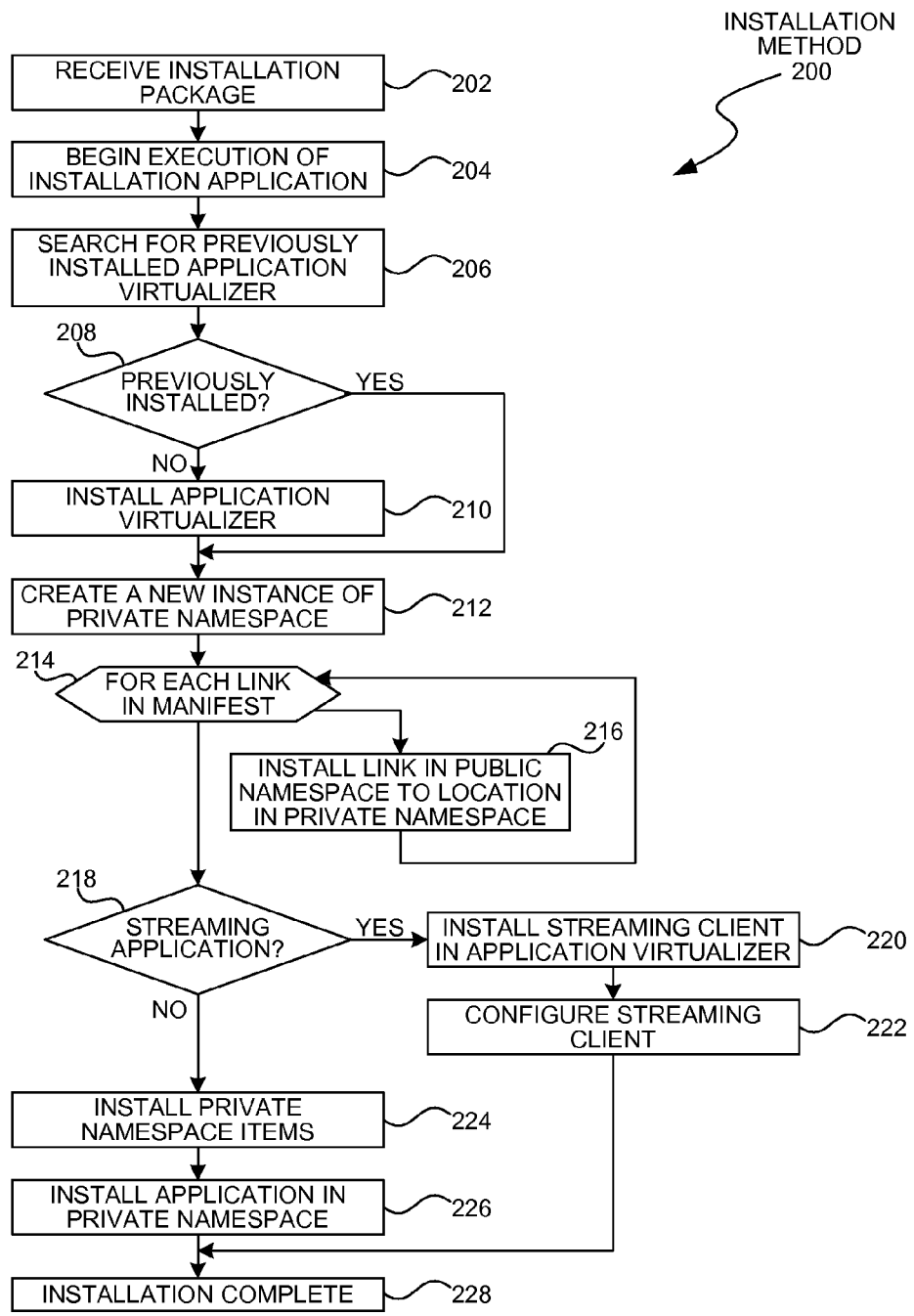
FIG. 2 is a flowchart illustration of an embodiment showing a method for installing a virtualized application.

FIG. 2 is a flowchart illustration of an embodiment 200 showing a method for installing a virtual application. Embodiment 200 is an example of a method that may be performed by an installation application that may execute natively on an operating system to install and configure components so that a virtual application may be executed. Embodiment 200 is an example of a process that may be performed by an installation application, such as the installation application 128 or 156 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates one mechanism by which a virtual application may be configured to be operated on a client device. The method of embodiment 200 may install an executable program that may operate natively to isolate the application, and then populate a private namespace for that application. The method may also include links from a public namespace into locations in the private namespace.

An installation package may be received in block 202, and an installation application may begin executing in block 204. The operations of the installation application may be reflected in the remaining portion of embodiment 200.

The installation application may search for a previously installed application virtualizer in block 206. If an application virtualizer has not been installed in block 208, an application virtualizer is installed in block 210.

A new instance of a private namespace may be created in block 212. In the case of a previously installed application virtualizer, a new instance of a private namespace may allow one application virtualizer to execute two or more virtual applications, each with its own private namespace. In some embodiments, a second instance of an application virtualizer may be executing to support a second virtual application, while in other embodiments, a single instance of an application virtualizer may be capable of executing two or more virtualized applications separately yet simultaneously.

The links in the manifest may be processed in block 214. The manifest may be a listing, such as a text file or XML file, that contains items to be processed by an installation application. For each link in block 214, a link may be installed in a public namespace and may link to a location in the private namespace in block 216. The link may be a pointer, reference, location, or other identifier that may be accessed from the public namespace and allow access into the private namespace.

One use scenario may be to register the virtual application as an application that may be associated with a specific file type. Many operating systems may associate files with specific filename extensions to specific applications that may open and process the files. For example, a registry setting may be defined that associates each file with a filename ending in ".docx" as being associated with a specific word processing application. When the word processing application is a virtual application, the link in the registry may point to the virtual application's private namespace and may cause the virtualized word processing application to execute.

Some links established in block 216 may cause the virtual application to be launched. Some such links may allow parameters or other information to be passed to the application so that the application may process the information. In some instances, the virtual application may return a value or other information in response to the call.

In some cases, the links established in block 216 may point to configuration information that may be stored in a file or setting in the private namespace. In such cases, the links may be traversed to examine the file or setting and to return a value or other information that may be stored in the location.

After installing each link in block 214, the application may be configured.

If the application is a streaming application in block 218, a streaming client may be installed in block 220 and configured in block 222. The streaming client may communicate with a streaming server to fetch portions of the application as the application requests the portion. The configuration in block 222 may include installing an address for the streaming server and configuring other parameters that may be used by a streaming client. After configuration in block 222, the installation may be complete in block 228

If the application is not a streaming client in block 218, all of the items in the private namespace may be installed in block 224, along with the application in block 226. The operations of blocks 224 and 226 may represent a full installation of the virtual application. The application may be completely installed so that the application may execute on a device without accessing other devices. After installation in block 226, the installation may be complete in block 228.

Figure 3:
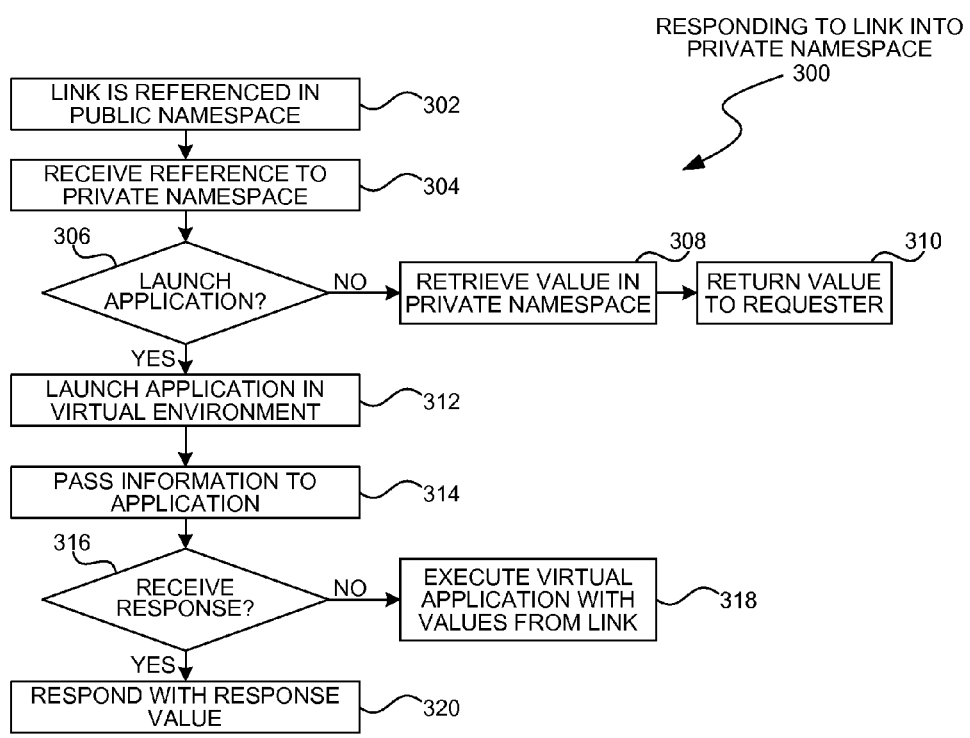
FIG. 3 is a flowchart illustration of an embodiment showing a method for responding to a link into a private namespace.

FIG. 3 is a flowchart illustration of an embodiment 300 showing a method for responding to a link into a private namespace. Embodiment 300 is a simplified example of some operations that may be performed by an application virtualizer when a link from a public namespace is followed into a private namespace.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of some of the processes that may be performed by an application virtualizer. An application virtualizer may monitor references into the private namespace from links that may be available in a public namespace. The application virtualizer may intercept the links from the public namespace and enable connections into the private namespace.

In block 302, a link may be referenced in the public namespace. The link may be referenced by an application making a query to the registry to determine a value for a key, for example. In another example, a user may click on a shortcut in a start menu that references a link in the public namespace to an executable file in the private namespace.

In still another example, a user may use a command shell to connect the output of one application to a virtual application by a pipeline command. The virtual application may be referenced using a name in the public namespace that may link to another location in the private namespace.

A reference may be received by an application virtualizer in block 304 that may link into the private namespace. If the request for the link may be handled by reading the value in the private namespace in block 306 and not launching the application, the value may be retrieved in block 308 and returned to the requester in block 310.

If the request can be fulfilled by launching the virtual application in block 306, the application may be launched in the virtual environment in block 312. If a parameter, value, or other information was included in the reference received in block 304, the information may be passed to the application in block 314.

Some references may cause the application to launch and may receive a value. For example, a file type association may be used by an operating system to receive a selection from a user for a specific file type to open, then the operating system may look up the file type association in the public namespace. The file type association may link into the private namespace, at which time the application virtualizer may launch the application in block 312 and pass the filename to the application in block 314. The application may then open the file and begin operation.

In such an example, a user may be presented with a user interface generated by the virtual application, and the user may begin interacting with the application. In such an example, no response from the application may be expected in block 316 and the virtual application may execute with the values received.

In another example, a virtual application may be referenced in a command shell with a pipeline command. A pipeline command may direct the output of one application to the input of another application. Sometimes, two, three, or more applications may be pipelined together. In such an example, the virtual application may receive input from one application and respond with output that may be consumed by another application. In such an example, a response may be expected in block 316 and the application virtualizer may respond with the response value in block 320.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor for operating a virtual application on a device, the method comprising:
    formulating a link into a private namespace, the link providing an extension point for accessing a stored item related to the virtual application, the stored item stored in the private namespace, the private namespace private to the virtual application such that one or more other applications at the device are prevented from natively accessing the stored item, the link configured such that the one or more other applications can interact with the virtual application in a specified manner by accessing the stored item;
    storing the link in a public namespace of a host operating system at the device to make the link accessible to the one or more other applications;
    receiving a selection of the link, the link having been selected through the public namespace by an application from among the one or more other applications; and
    in response to receiving the selection of the link:
        identifying the stored item from the link; and
        permitting the application to interact with the virtual application in the specified manner through access to the stored item.

2. The method of claim 1, further comprising:
    formulating a second link into the private namespace, the second link providing an extension point for accessing a second stored item related to the virtual application, the second link configured such that the one or more other applications can interact with the virtual application in a different specified manner by accessing the second stored item;
    storing the second link in the public namespace;
    receiving a selection of the second link, the second link having been selected through the public namespace by a second application from among the one or more other applications; and
    in response to receiving the selection of the second link:
        identifying the second stored item from the second link; and
        permitting the second application to interact with the virtual application in the different specified manner through access to the second stored item.

3. The method of claim 2, wherein the application and the second application are the same application.

4. The method of claim 1, wherein formulating a second link comprising formulating a second link in one of: a host file system of the device or a host registry of the device.

5. The method of claim 1, wherein an application virtualizer and the link are included in an installation package.

6. The method of claim 5, wherein the installation package comprises an installation program, installation program being configured to:
    read a manifest comprising the link; and
    create the link in the host operating system.

7. The method of claim 1, wherein receiving a selection of the link comprises receiving a selection of the link from a second virtual application executing at the device; and
    wherein permitting the application to interact with the virtual application in the specified manner comprises permitting the second virtual application to interact with the virtual application in the specified manner.

8. The method of claim 1, further comprising streaming the virtual application into an application virtualizer.

9. The method of claim 1, wherein formulating a link into a private namespace comprises formulate a link into the private namespace that permits one of: passing parameters to the virtual application and traversing configuration information for the virtual application.

10. The method of claim 1, wherein formulating a link into a private namespace comprises formulating a link from one of: a file system in said public namespace or a registry in said public namespace, into said private namespace.

11. A computer program product, the computer program product for implementing a method for operating a virtual application on a device, the computer program product comprising one or more computer storage memory devices having stored thereon computer-executing instructions that, when executed by a processor, perform the method, including the following:
    formulate a link into a private namespace, the link providing an extension point for accessing a stored item related to the virtual application, the stored item selected from among one or more stored items stored in the private namespace, the private namespace private to the virtual application such that one or more other applications at the device are prevented from natively accessing the stored item, the link configured such that one or more other applications can interact with the virtual application in a specified manner by accessing the stored item;
    store the link in a public namespace of a host operating system at the device to make the link accessible to the one or more other applications;
    receive a selection of the link, the link having been selected through the public namespace by an application from among the one or more other applications; and in response to receiving the selection of the link:
    identify the stored item from the link; and
    permit the application to interact with the virtual application in the specified manner through access to the stored item.

12. The computer program product of claim 11 further comprising computer-executable instructions that, when executed, perform the following:

formulate a second link into the private namespace, the second link providing an extension point for accessing a second stored item related to the virtual application, the second stored item selected from among the one or more stored items, the second link configured such that the one or more other applications can interact with the virtual application in a different specified manner by accessing the second stored item;

store the second link in the public namespace;

receive a selection of the second link, the second link having been selected through the public namespace by a second application from among the one or more other applications; and in response to receiving the selection of the second link:
identify the second stored item from the second link; and
permit the second application to interact with the virtual application in the different specified manner through access to the second stored item.

13. The computer program product of claim 11, wherein computer-executable instructions that when executed formulate a link into a private namespace comprise computer-executable instructions that when executed formulate a link into the private namespace that permits one of: passing parameters to the virtual application and traversing configuration information for the virtual application.

14. The computer program product of claim 11, computer-executable instructions that when executed perform formulating a link into said private namespace comprise computer-executable instructions that when executed perform formulating a link from one of: a file system in said public namespace or a registry in said public namespace, into said private namespace.

15. At a device, method for accessing a virtual application, the method comprising:
receiving an indication that a link has been stored in a public namespace at the device to make the link accessible to one or more other applications, the link providing an extension point for accessing a stored item related to the virtual application, the stored item stored in a private namespace, the private namespace private to the virtual application such that another application at the device is prevented from natively accessing the stored item, the link configured such that the other application can interact with the virtual application in a specified manner by accessing the stored item;

the other application selecting the link through the public namespace; and in response to selecting the link, the application interacting with the virtual application in the specified manner through access to the stored item, including identifying the stored item from the link.

16. The method of claim 15, wherein an application at the device selecting the link comprises the application selecting the link to pass parameters to the virtual application.

17. The method of claim 15, wherein an application at the device selecting the link comprises the application selecting the link to launch the virtual application.

18. The method of claim 15, wherein an application at the device selecting the link comprises the application selecting the link to examine configuration information for the virtual application.

19. The method of claim 15, wherein in response to selecting the link, the application interacting with the virtual application in the specified manner comprises in response to selecting the link, the application launching the virtual application.

20. The method of claim 15, wherein in response to selecting the link, the application interacting with the virtual application in the specified manner comprises in response to selecting the link, the application receiving a value for a registry key, the registry key value in a registry in the private namespace.

* * * * *